United States Patent [19]

Ochiai et al.

[11] Patent Number: 5,503,207
[45] Date of Patent: Apr. 2, 1996

[54] PNEUMATIC TIRE INCLUDING LATERAL GROOVES

[75] Inventors: Kiyoshi Ochiai, Kobe; Kenichi Fujiwara, Miki, both of Japan

[73] Assignee: Sumitomo Rubber Industries, Ltd., Hyogo, Japan

[21] Appl. No.: 292,187

[22] Filed: Aug. 18, 1994

[30] Foreign Application Priority Data

Aug. 23, 1993 [JP] Japan ................................. 5-230893
Jun. 10, 1994 [JP] Japan ................................. 6-152603

[51] Int. Cl.⁶ .................................................. B60C 11/13
[52] U.S. Cl. .................................................. 152/209 R
[58] Field of Search ........................... 152/209 R, 209 D

[56] References Cited

U.S. PATENT DOCUMENTS

| | | | |
|---|---|---|---|
| 2,121,871 | 6/1938 | Havens ................................. | 152/209 R |
| 2,637,362 | 5/1953 | Briscoe et al. . | |
| 3,115,919 | 12/1963 | Roberts et al. . | |
| 3,373,790 | 3/1968 | Newman et al. . | |
| 4,258,769 | 3/1981 | Makino et al. ..................... | 152/209 R |
| 4,649,975 | 3/1987 | Kogure et al. ..................... | 152/209 R |
| 4,676,290 | 6/1987 | Tansei et al. ........................ | 152/209 R |

FOREIGN PATENT DOCUMENTS

| | | |
|---|---|---|
| 2210517 | 12/1974 | France . |
| 603899 | 11/1986 | Germany . |
| 58-136502 | 8/1983 | Japan . |
| 62-286803 | 12/1987 | Japan . |
| 153304 | 6/1989 | Japan ................................. 152/209 D |
| 164606 | 6/1989 | Japan ................................. 152/209 R |
| 1237616 | 6/1971 | United Kingdom . |

Primary Examiner—Steven D. Maki
Attorney, Agent, or Firm—Birch, Stewart, Kolasch & Birch

[57] ABSTRACT

A pneumatic tire has a tread which is provided with main grooves extending continually in the circumferential direction and lateral grooves crossing between the adjoining main grooves and having a groove depth DB of 0.6 to 0.95 times the mean DM of groove depths DA1, DA2 of the adjoining main grooves. The lateral groove is composed of, on a section orthogonal to a groove center line, an upper portion having an opening on the tread surface, a lower portion having a groove bottom and a constricted waist portion consecutive to the upper and lower portions and having the narrowest width WS of its lateral groove. And the tire is satisfied with the following relation;

1.0 mm ≤ WS ≤ 4.0 mm
1.3 ≤ WW/WS ≤ 3.0
0.15 ≤ DS/DB ≤ 0.7 where;
WS being the narrowest width.
WW being the widest width of the lower portion,
DS being the length of the waist portion in the tire radial direction.

6 Claims, 7 Drawing Sheets

PNEUMATIC TIRE INCLUDING LATERAL GROOVES

BACKGROUND OF THE INVENTION

The present invention relates to a pneumatic tire capable of preventing heel and toe wear on the block surface, and maintaining the wet grip performance and wear appearance for a long period.

FIELD OF THE INVENTION

In high speed running on a wet road surface, hitherto, in order to improve the water discharging performance and suppress the phenomenon of hydroplaning, the tread surface was provided with a plurality of main grooves extending in the circumferential direction, and multiple lateral grooves linking with the longitudinal grooves.

Such lateral grooves have been designed to suppress the hydroplaning effectively and maintain the appearance even in the terminal stage of the tread wear by processing as shown in FIG. 11, for example, (1) Deepening the groove depth DB of lateral grooves.

(2) Widening the groove width WO' of lateral grooves.

(3) Processing the sectional shape of lateral grooves in U form.

However, when the lateral grooves are thus constituted, when running on a dry road, uneven wear occurring along the groove edge of the lateral grooves, or so-called heel and toe wear occurs, and the durability is lowered.

The present inventor has reached the invention by discovering that:

(1) The sectional shape of the lateral grooves should not be uniform in groove width, but a middle of the groove in the depth direction should be provided with a waist portion constricted in width so as to make the upper and lower portions wider than this constricted waist portion.

(2) By defining the groove width ratio of the lower portion and constricted waist portion, the wet grip performance and tire appearance can be maintained even in the terminal stage of wear.

(3) By defining further the ratio of the length of the constricted waist portion and the depth of the lateral groove, the wet grip performance is enhanced.

SUMMARY OF THE INVENTION

It is hence a primary object of the invention to present a pneumatic tire capable of preventing heel and toe wear, maintaining the wet grip performance and wear appearance for a long period, and enhancing the running performance also on a snow-clad road.

According to one aspect of the present invention, a pneumatic tire comprising a tread which has a plurality of main grooves extending continuously in the circumferential direction and a plurality of lateral grooves crossing between the adjacent main grooves and having a groove depth DB of 0.6 to 0.95 times the mean DM of groove depths DA1, DA2 of the adjoining main grooves. The plurality of lateral grooves are composed of, on a section orthogonal to a groove center line, an upper portion having an opening on the tread surface, a lower portion having a groove bottom and a constricted waist portion adjacent the upper and lower portions and having the narrowest width WS of each lateral groove. And the pneumatic tire satisfies the following relation;

$1.0 \text{ mm} \leq WS \leq 4.0 \text{ mm}$ $1.3 \leq WW/WS \leq 3.0$ $0.15 \leq DS/DB \leq 0.7$ where;

WS being the narrowest width,

WW being the widest width of the lower portion,

DS being the length of the waist portion in the tire radial direction.

An opening width WO of the lateral grooves may be 1.5 to 6.0 times the narrowest width WS.

The groove depth DB of the lateral groove is defined at 0.6 to 0.95 times the mean DM of the groove depth of the main grooves at its both sides. If the groove depth DB is less than 0.6 times the mean DM, the lateral groove is eliminated before the tread reaches its wear life. As a result, the wet grip performance is not maintained for a long time, and the tire appearance is spoiled. If exceeding 0.95 times, to the contrary, the pattern rigidity is lowered, and uneven wear of heel and toe occurs early in the groove edge of the lateral groove.

In the constricted waist portion of the lateral groove, the narrowest width WS is defined at 1.0 mm to 4.0 mm. If the width WS is less than 1.0 mm, the water on the tread surface is blocked in the constricted waist portion and cannot reach the lower portion. As a result, the water discharging performance is inferior, thereby lowering the wet frictional force. To the contrary, if exceeding 4.0 mm, when contacting with the ground, if the block is deformed by static or dynamic load, the opposing groove walls do not contact with each other, and hence the pattern rigidity is insufficient, and heel and toe wear occurs early.

The ratio DS/DB of the length DS of the constricted waist portion to the lateral groove depth DB is defined at 0.15 to 0.7. If the ratio DS/DB is less than 0.15, the pattern rigidity is insufficient, and heel and toe wear is likely to occur. If exceeding 0.7, since the groove area of the upper and lower portion cannot be maintained sufficiently, the water cannot be discharged effectively so as to lower the water discharging performance. More preferably, the ratio DS/DB is in a range of 0.2 to 0.3.

These relationships have been proved by the experiments described hereinbelow, and the test data are shown in FIG. 6.

The lateral groove can efficiently guide the water into the main grooves from the lower portion wider than the constricted waist portion, thereby enhancing the wet frictional force. Still more, unlike the conventional tire, it is not necessary to form multiple sipings, and the pattern rigidity is maintained, and uneven wear such as heel and toe wear can be suppressed.

If the ratio WW/WS is less than 1.3, the wet frictional force drops, or when exceeding 3.0, the pattern rigidity declines and uneven wear is likely to occur. Moreover when exceeding 3.0, it is hard to separate the tire from the die in vulcanizing, and a rubber defect is likely to occur in that area. At the boundary of the ratio WW/WS (=1.3), as shown in FIG. 7, it has been experimentally proved that the wet frictional force changes significantly.

In the invention, these constituent elements are organically bonded and unified, and the wet frictional force and wear appearance can be maintained until the terminal stage of wear while preventing occurrence of heel and toe wear.

BRIEF DESCRIPTION OF THE DRAWINGS

An embodiment of the present invention will now be described, by way of example, referring to the attached diagrammatic drawings, in which.

DETAILED DESCRIPTION OF THE INVENTION

Figure 1:
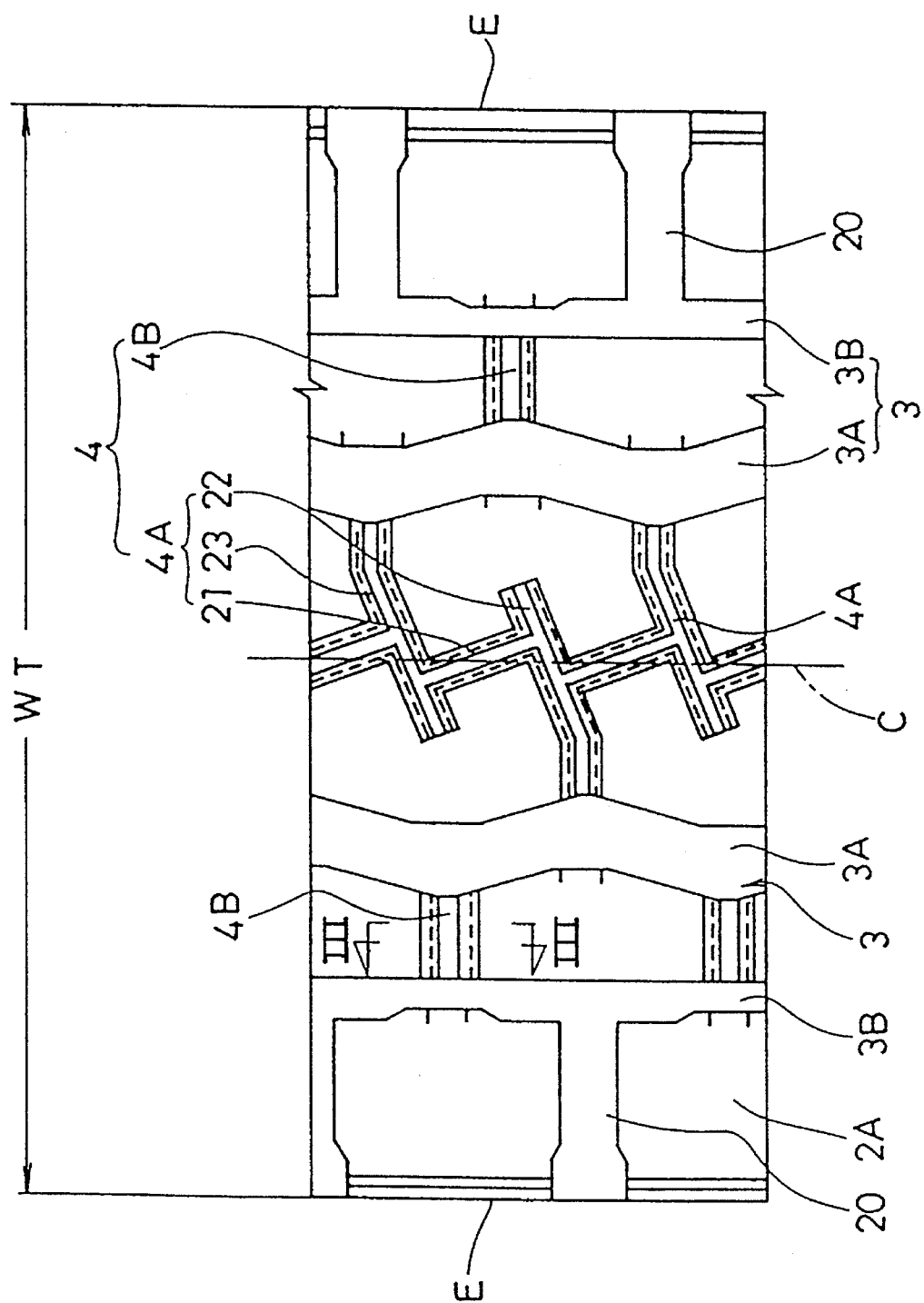
FIG. 1 is a developed plan view showing a pattern of tire in an embodiment of the invention.

A pneumatic tire 1 comprises a tread 2 with a tread pattern, two side walls 13 each extending inwardly in the tire's radial direction from both ends of the tread 2 and two beads 14 one located at the inward end of each sidewall 13. The pneumatic tire 1 is, also, reinforced by a toroidal carcass 16 extending from the tread 2 through the side walls 13 and turned up around the bead core 15 of the bead 14, a belt layer 17 disposed radially outside the carcass 16, and a bead apex rubber 18 extending radially outwardly from the bead core 15 between the carcass main body and carcass turned up portion.

The carcass 16 is composed of one carcass ply of steel cords in this embodiment. The carcass ply has the carcass cords arranged at an angle of 80 to 90 degrees, in this embodiment, to the tire equator C and covered with topping rubber. Nylon, polyester, rayon, aromatic polyamide, or other organic fiber cords are, also, used as carcass cords.

The belt layer 17 is composed of two to four, and four belt plies 17A in this embodiment. The belt plies 17A have belt cords such as nylon, polyester, rayon, aromatic polyamide, or other organic fiber cords or steel cords, which are arranged in mutually intersecting directions between plies.

On the other hand, the tread 2 has a plurality of main grooves 3 extending continuously in the circumferential direction and a plurality of lateral grooves 4 crossing between the adjacent main grooves 3 in the tire axial direction.

The main grooves 3 comprise, in this embodiment, a pair of inner main grooves 3A folded in zigzag, being disposed at both sides of the tire equator C, and a pair of outer main grooves 3B interposed between the inner main grooves 3A and tread edge E, in a linear form, alternately disposing broad portion and narrow portion.

Figure 2:
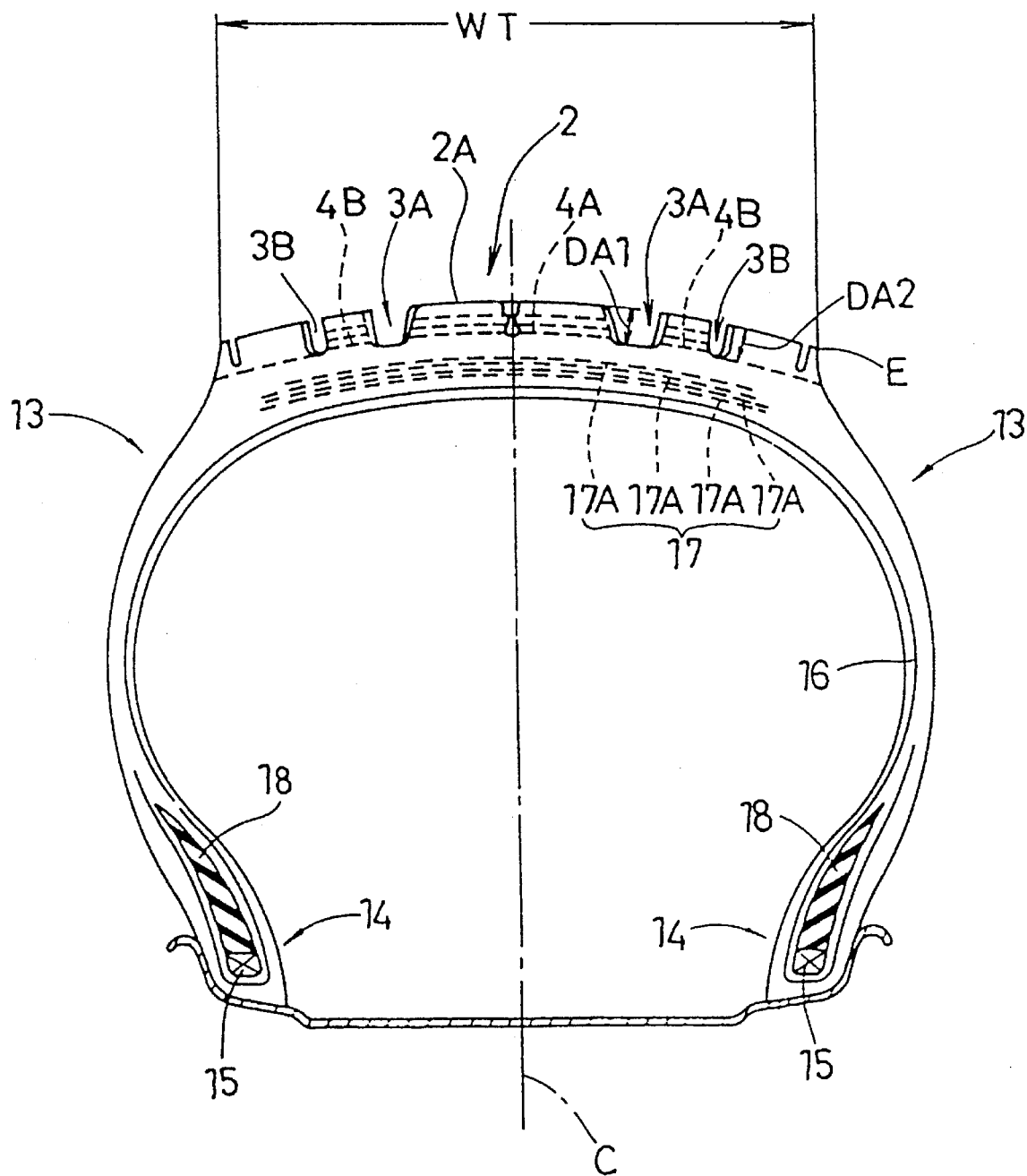
FIG. 2 is an axial direction sectional view of the tire.

The inner and outer main grooves 3A, 3B are a trapezoid sectional shape which having a maximum groove width at the opening on the tread surface, as shown in FIG. 2. The maximum groove width of these inner and outer main grooves 3A, 3B is set in a range of 0.06 to 0.12 times the tread width WT, and the groove depths DA1, DA2 are set in a range of 0.08 to 0.16 times the tread width WT.

The lateral grooves 4 comprise middle lateral grooves 4A crossing between the inner main grooves 3A and outer lateral grooves 4B crossing between the inner main groove 3A and the outer main groove 3B. In this embodiment, and lug grooves 20 extending from the outer main groove 3B to the tread edge E are provided.

The middle lateral groove 4A is in a continuous Z-form composed of two lateral groove elements 22, 23 extending from one and the other inner main grooves 3A, 3A in the tire axial direction and connecting groove elements 21 between the lateral groove elements 22, 23 in the circumferential direction near the tire equator C. Therefore, the adjacent middle main grooves 3A, 3B are mutually coupled with the groove elements 21, 22, 23. The outer lateral grooves 4B linearly couple the inner and outer main grooves 3A, 3B nearly parallel in the tire axial direction.

Figure 3:
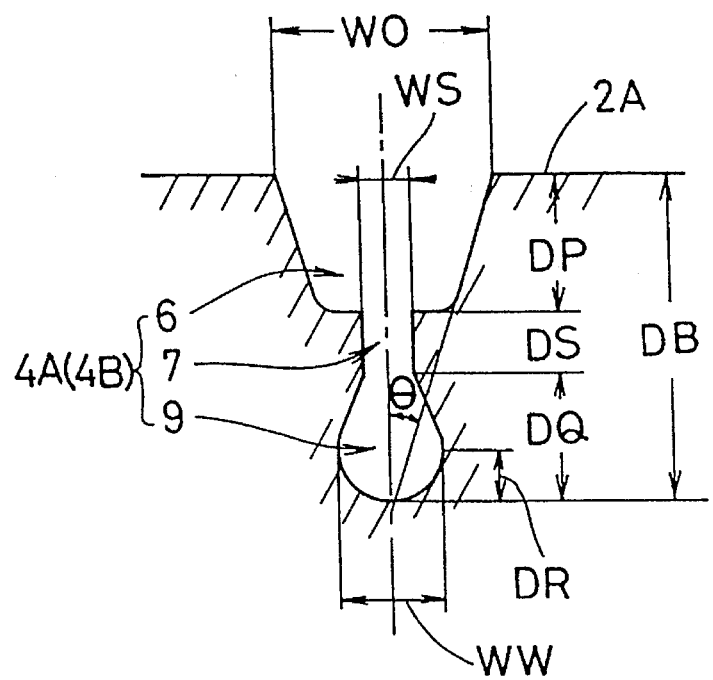
FIG. 3 is a sectional view along line III—III of FIG. 1 showing an example of lateral grooves.

The outer lateral groove 4B has a gourd-shape, as shown in FIG. 3, on a section orthogonal to the groove center line, such that a middle of the groove in the depth direction is provided with a waist portion 7 constricted in width. That is, the outer lateral groove 4B consists of an upper portion 6 which opens on the tread surface 2A, a constricted waist portion 7 which extends from the radially inner end of the upper portion 6 and has the narrowest width WS of the lateral groove 4B to a lower portion 9 which is radially inward of the radially inner end of the constricted waist portion 7, and has a groove bottom. Therefore, the upper and lower portions 6, 9 are formed robe wider than the constricted waist portion 7. Also, the upper, waist and lower portions 6, 7, 9 are distinguished by a vending point or an inflection point at which profiles of the upper, waist and lower portions 6, 7, 9 intersect to each other. In this embodiment, the upper, waist and lower portions 6, 7, 9 intersect at an edge, respectively.

The groove depth DB of the outer lateral groove 4B is set at 0.6 to 0.95 times the mean DM of the groove depths DA1, DA2 of the inner and outer main grooves 3A, 3B.

The narrowest width WS of the outer lateral groove 4B is set at 1.0 mm to 4.0 mm in ordinary automotive tires, such as tires for passenger car, small truck and truck-bus, except for tires for special vehicles such as construction vehicles and agricultural vehicles. As mentioned above, it is supposed that the opposing groove walls of the lateral grooves contact with each other at normal ground contact state. Therefore, in the tires for the designated vehicles, the effect for contacting the opposing groove walls is not so much influenced by the tire size.

In the embodiment, the opposing groove walls in the constricted waist portion 7 are parallel to each other so as to have an equal width over the entire region of the constricted waist portion 7.

The ratio DS/DB of the length DS in the tire radial direction of the constricted waist portion 7 to the groove depth DB of the outer lateral groove 4B is set at 0.15 to 0.7.

The lower portion 9 is a circular shape like a bottom of a flask, and its maximum groove width WW is set at 1.3 to 3.0 times the narrowest width WS.

The upper portion 6 is formed, in this embodiment, like a funnel with a wide opening. The opposing groove walls in the upper portion 6 are inclined at an angle θ so that the water may be easily guided from the ground to the lateral grooves 4. Since the constricted waist portion 7 achieves the effect for contacting the opposing groove walls to enhance the rigidity, even if the upper portion 6 is formed wider than the constricted waist portion 7, uneven wear does not occur.

In the embodiment, moreover, the ratio WO/WS of the groove width WO at the opening on the tread surface 2A to the narrowest width WS is set at 1.5 to 6.0. By thus defining the ratio WO/WS, enhancement of guiding efficiency of water into the constricted waist portion and maintenance of wear resistance are both achieved.

By setting the mean groove width of the upper portion 6 larger than 1.5 times, or more preferably larger than 2.5 times the narrowest width WS, or by setting the angle θ larger than 15 degrees, or more preferably larger than 25 degrees, the guiding efficiency of water into the constricted waist portion 7 may be further enhanced. The above mean groove width of the upper portion 6 is the mean of the groove widths at radially upper and lower ends of the upper portion 6.

If the ratio WO/WS is less than 1.5, the opening width WO is too narrow, and the water may not be efficiently guided to the lateral groove 4B. If the ratio WO/WS is set larger than 6.0, the effect of guiding the water is not improved so much, and since the ground contact area decreases too much, the wear resistance of the tread may be lowered. Considering these reasons, the ratio WO/WS is preferred to be 1.5 to 6.0, and more preferably in a range of 2.5 to 5.0.

The middle lateral groove 4A has a groove sectional shape nearly the same as the outer lateral groove 4B, and has the upper portion 6, the constricted waist portion 7 and the lower portion 9 in the same constitution as above.

The lug groove 20 is mostly out of the ground contact area in the normal ground contact state, and is hence formed in a same U-section as in the ordinary one considering only the water discharging performance.

Figure 4:
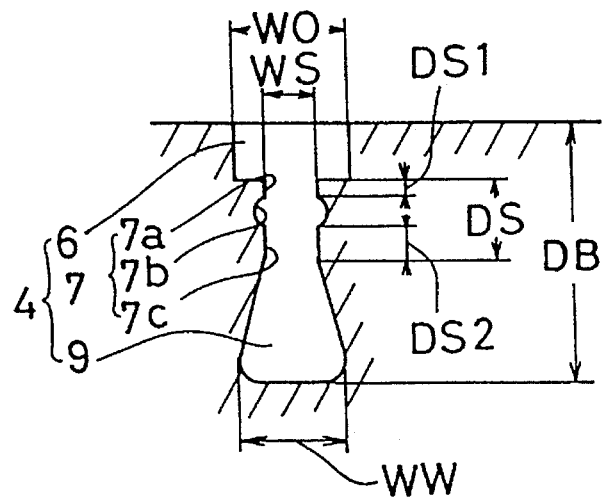
FIG. 4 is a sectional view showing a second embodiment of lateral grooves.
Figure 5:
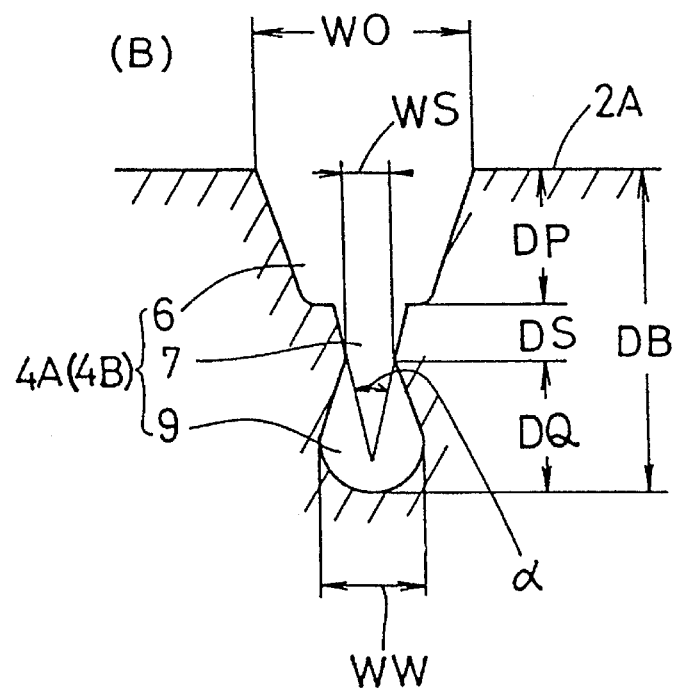
FIG. 5 is a sectional view showing a third embodiment of lateral grooves.
Figure 6:
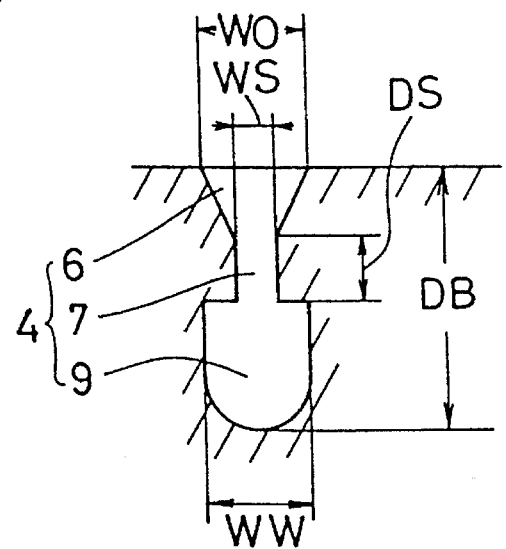
FIG. 6 is a sectional view showing a fourth embodiment of lateral grooves.

Other forms of lateral grooves 4 are shown in FIGS. 4, 5, 6.

In FIG. 4, the lower portion 9 is formed in a trapezoidal form gradually increasing radially inwardly in its groove width. The constricted waist portion 7 is provided with a concave part 7b wider in width at radially middle position. Above and below the concave part 7b, an upper part 7a and a lower part 7c extending in the same width are provided. The sum (DS1+DS2) of the lengths of the upper part 7a and lower part 7c in the radial direction is preferred to be ½ times or more the overall length DS of the constricted waist portion 7. If less than ½ times, the pattern rigidity is insufficient, and uneven wear may occur. More preferably, it should be kept ⅔ times or more.

Moreover, the constricted waist portion 7 may be formed in a taper decreasing the width radially inwardly as shown in FIG. 5, or in a reverse taper increasing the width radially inwardly. In this case, the groove width of the constricted waist portion 7 is preferred to be 4.0 mm or less along the entire region of the constricted waist portion 7, more preferably 3.0 mm. And to prevent local concentration of the stress when the opposing walls contact to each other, the tapered angle α of the opposing walls may be set at 6 degrees or less.

However, if the groove width of the constricted waist portion 7 is uneven as shown in FIGS. 4 or 5, as mentioned above, there is a risk of concentration of stress in part of the constricted waist portion 7. Therefore, the constricted waist portion 7 should be more preferably formed so that the opposing groove walls may be parallel to each other as shown in FIG. 3 or FIG. 6.

EXAMPLES

A) Test 1

In the tires of which size is 11R 22.5, constituted as shown in FIGS. 1 to 3, the ratio WS/WW was varied, and the frictional force when running on a wet road was evaluated.

Figure 7:
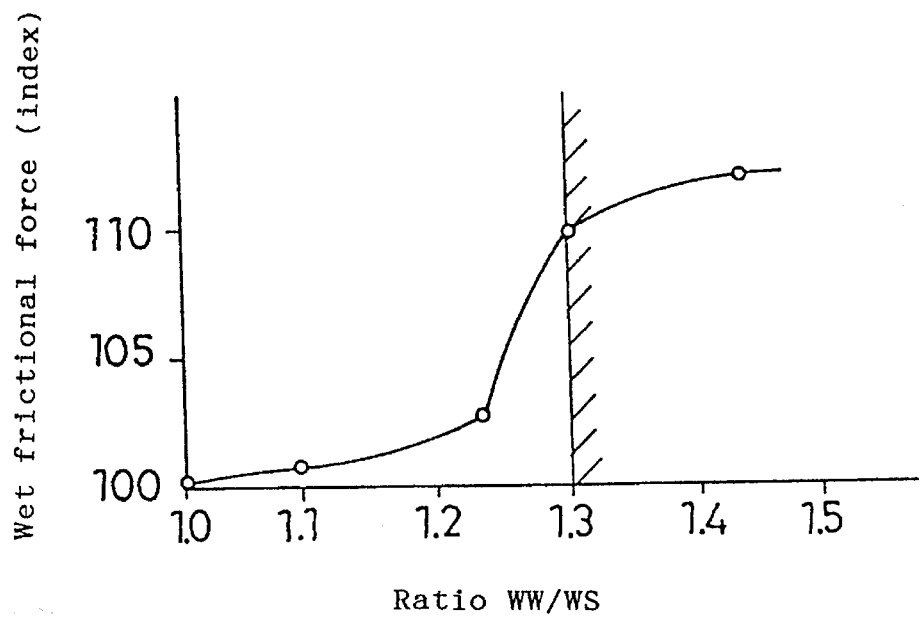
FIG. 7 is a graph showing the relation between the ratio WW/WS of the lateral grooves and the wet frictional force.

1) Frictional force when running on wet road (wet frictional force):

Test tires are installed in 10-wheel truck, which is loaded as specified and driven on an asphalt road at a speed of 60 km/h, and only the front tires are braked by locking, and the speed for recovering the frictional force is measured. And the result of the test is shown in FIG. 7 by the index with the value at the ratio WS/WW of 1.0 as 100. The greater figure means the better performance. A favorable wet frictional force is recognized by setting the ratio WS/WW at 1.3 or more.

B) Test 2

Figure 8:
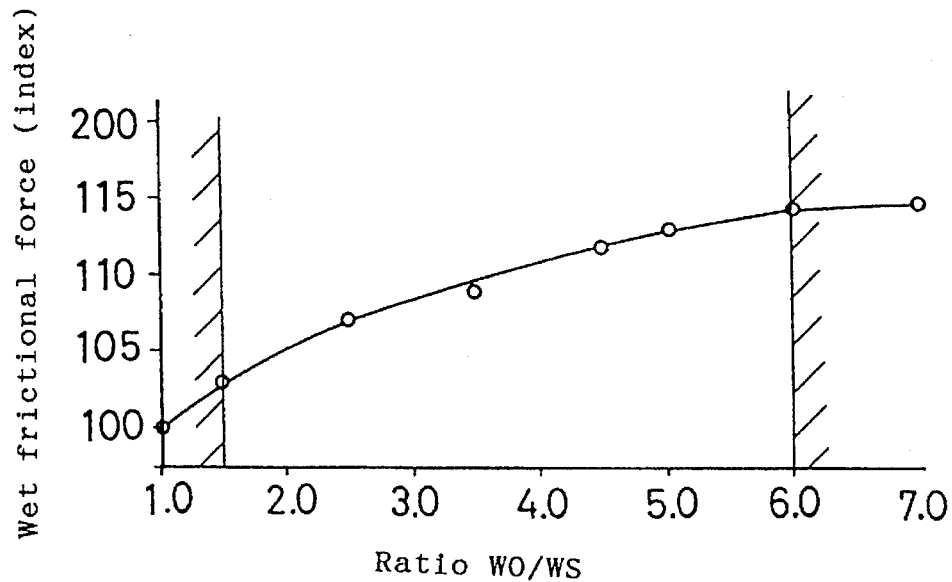
FIG. 8 is a graph showing the relation between the ratio WO/WS of the lateral grooves and the wet frictional force.

Using tires in the same size as in test 1, the ratio WO/WS is varied, and the frictional force in running on a wet road is evaluated. Testing in the same condition as in test 1, the result is indicated in FIG. 8 by the index with the value at the ratio WO/WS of 1.0 as 100. The wet frictional force is increased by setting the ratio WO/WS at 1.5 or more, but when exceeding 6.0, the frictional force tends to be stable in high range.

C) Test 3

Figure 9:
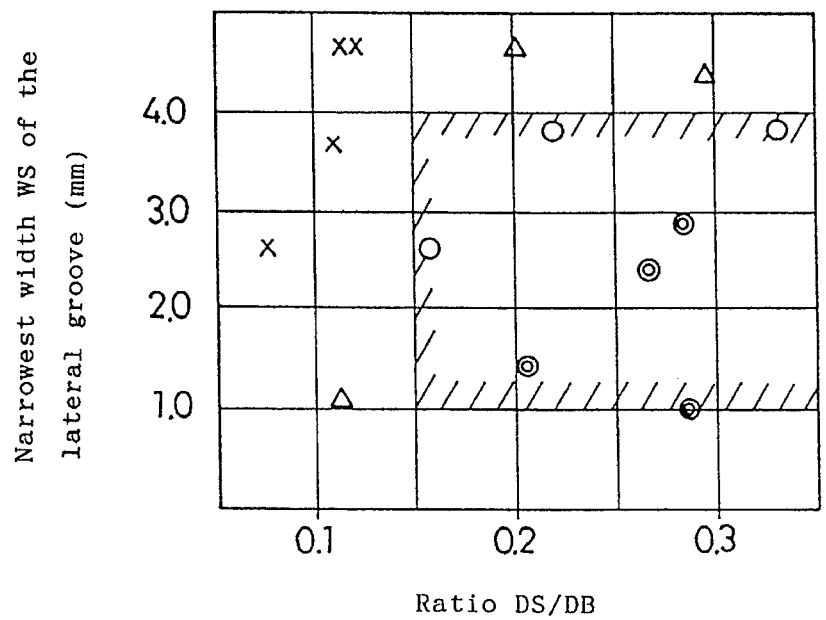
FIG. 9 is a graph showing the wear amount of tread surface against the ratio DS/DB and the narrowest width WS.

Using the tires in the same size and constitution as in test 1, changes of heel and toe uneven wear are investigated by changing the narrowest width WS and the ratio DS/DB. In the test method, using the same vehicle as in test 1, after running for 30,000 km, heel and toe wear was measured. The test result is shown in FIG. 9. The symbols in the diagram show the magnitude of wear recorded in Table 1. As a result of the test, it is confirmed that the resistance to uneven wear is excellent when the narrowest width WS is in a range of 1.0 to 4.0 mm and the ratio DS/DB is 0.15 or more.

D) Test 4

Figure 10:
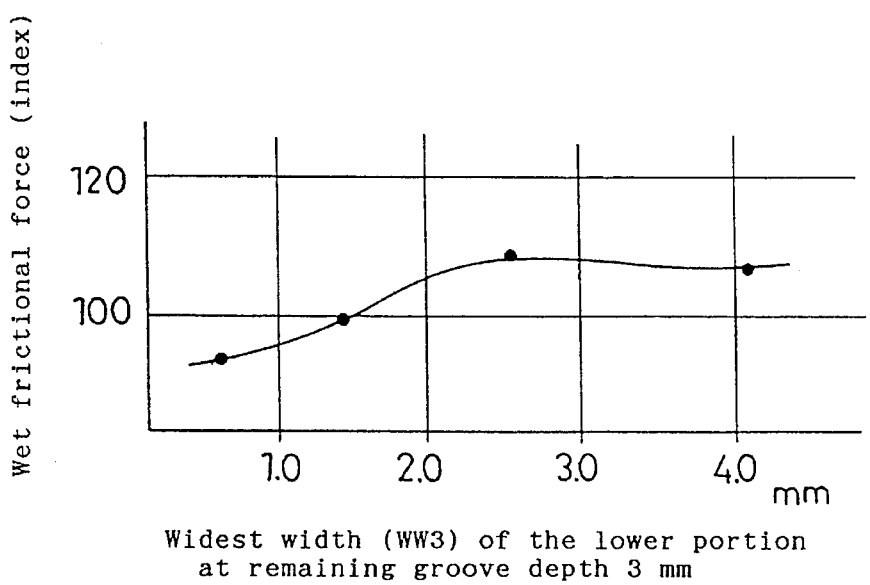
FIG. 10 is a graph showing the relation between the widest groove width WW3 and the wet frictional force when the lateral grooves are left over by 3 mm depth.

Using tires of the same size and constitution as in test after trial run, when the lateral grooves 4 are worn to leave 3 mm in depth, the relation between the groove width WW3 in the lower portion 9 and the frictional force of running on wet road is investigated. Before the trial run, the ratio WW/WS is 1.3. The test method conforms to test 1, and the wet frictional force is expressed as the index with the value of WW3 of 1.3 mm as 100. The greater figure means the better performance. The test result is shown in FIG. 10. As known from the result, in the terminal stage of wear of the remaining groove of 3 mm, it is confirmed that the wet frictional force is maintained as far as the groove width of the lower portion 9 is 1.3 mm.

E) Test 5

Figure 11:
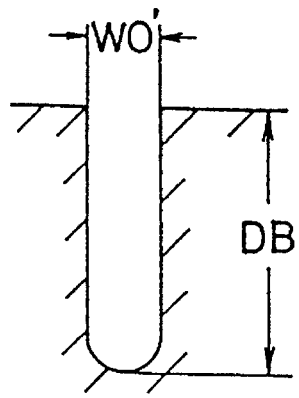
FIG. 11 is a sectional view showing lateral grooves in a conventional tire.
Figure 12:
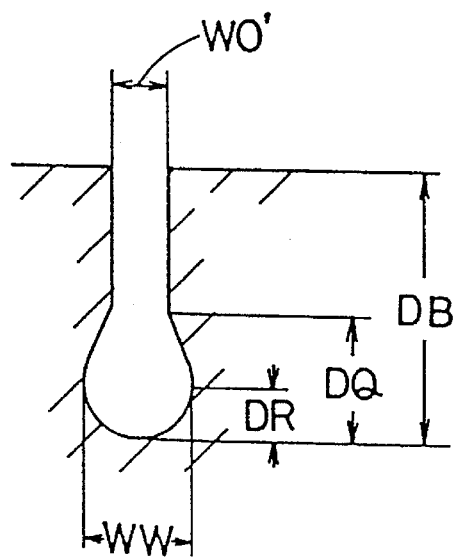
FIG. 12 is a sectional view showing lateral grooves in a comparative tire of Table 1.

In the tires of the same size and same constitution as in test 1, the tires having the lateral grooves of the invention (embodiments) and tires having the lateral grooves in FIGS. 11 or 12 (comparisons 1 to 3) are compared in the wet frictional force, heel and toe wear amount, and wet frictional force (in the remaining groove of 3 mm). The wet frictional force conforms to test 1, the heel and toe wear, test 3, and the wet frictional force in remaining groove of 3 mm, test 4. The index is shown with comparison 2 taken as 100, and the greater number meaning the better result. The test results are shown in Table 2. As a result of the tests, as compared with the comparisons, the embodiments are confirmed to be enhanced in the wet frictional force, heel and toe wear amount, and wet frictional force in the remaining groove of 3 mm, in good balance, and are recognized to have achieved the object.

TABLE 1

| Symbol | Wear amount |
| --- | --- |
| ⊙ | Less than 1.0 mm |
| ○ | 1.0 to 1.5 mm |
| Δ | 1.5 to 2.0 mm |
| × | 2.0 to 2.5 mm |
| ×× | More than 2.5 mm |

TABLE 2

| | Embodiment | Comparison 1 | Comparison 2 | Comparison 3 |
| --- | --- | --- | --- | --- |
| Tread width: WT (mm) | 216 | 216 | 216 | 216 |
| Sectional shape of lateral grooves | FIG. 3 | FIG. 9 | FIG. 8 | FIG. 8 |
| Main groove depth: | | | | |
| DA1 (mm) | 16.5 | | 16.5 | |
| DA2 (mm) | 16.5 | | 16.5 | |
| Opening groove width: WO, WO' (mm) | 9.0 | 2.0 | 2.0 | 9.0 |
| Narrowest groove width: WS (mm) | 2.4 | — | — | — |
| Widest groove width in lower portion: WW (mm) | 4.0 | 4.0 | — | — |
| Lateral groove depth: DB (mm) | 15.0 | 15.0 | 15.0 | 15.0 |
| Length of waist portion: DB (mm) | 4.0 | — | — | — |
| Ratio DB/DM | 0.91 | 0.91 | 0.91 | 0.91 |
| Ratio WO/WS | 4.5 | — | — | — |
| Ratio WW/WS | 2.0 | — | — | — |
| Ratio DS/DB | 0.27 | — | — | — |
| Length of upper portion: DP (mm) | 5.0 | — | — | — |
| Length of lower portion: DQ (mm) | 6.0 | 6.0 | — | — |
| Distance from groove bottom of lower portion to maximum width position: DR (mm) | 3.5 | 3.5 | — | — |
| Angle θ (deg.) | 30° | — | — | — |
| Wet frictional force (index) | 120 | 107 | 100 | 130 |
| Heel and toe wear | ⊙ | ⊙ | ⊙ | ×× |
| Wet frictional force at remaining groove 3 mm (index) | 104 | 104 | 100 | 104 |

What is claimed is:

1. A pneumatic tire comprising a tread having a plurality of main grooves extending continuously in the circumferential direction and a plurality of lateral grooves crossing between the adjacent main grooves and having a groove depth DB of 0.6 to 0.95 times the mean DM of groove depths DA1, DA2 of the adjacent main grooves, wherein said plurality of lateral grooves are composed of, on a section orthogonal to a groove center line, an upper portion having an opening on the tread surface, a lower portion having a groove bottom and a constricted waist portion extending between the upper and lower portions and having the narrowest width WS of each lateral groove, said constricted waist portion comprises opposing groove walls being in parallel to each other or inclined at a tapered angle α of 6 degrees or less to each other, and having the following relationship;

1.0 mm ≦ WS ≦ 4.0 mm 1.3 ≦ WW/WS ≦ 3.0

0.15 ≦ DS/DB ≦ 0.7 where;

WS being the narrowest width,

WW being the widest width of the lower portion,

DS being the length of said constricted waist portion in the tire radial direction.

2. The pneumatic tire of claim 1, wherein said plurality of lateral grooves have a ratio WO/WS of an opening width WO on the tread surface to the narrowest width WS defined in a range of 1.5 to 5.0.

3. The pneumatic tire of claim 1, wherein said constricted waist portion includes a concave part, an upper part disposed radially outside of the concave part and a lower part disposed radially inside of the concave part.

4. The pneumatic tire of claim 3, wherein the sum of the lengths DS1 and DS2 of the upper part and the lower part in the tire radial direction is 0.5 times or more the overall length DS of said constricted waist portion.

5. The pneumatic tire of claim 1, wherein a mean groove width of the upper portion is 1.5 times or more the narrowest width WS.

6. The pneumatic tire of claim 1, wherein the opposing groove walls of the upper portion are each inclined at an angle θ of 15 degrees or more to the center plane of the lateral groove.

* * * * *